(12) United States Patent
Ikegami

(10) Patent No.: US 10,277,794 B2
(45) Date of Patent: Apr. 30, 2019

(54) CONTROL APPARATUS, CONTROL METHOD, AND RECORDING MEDIUM

(71) Applicant: CANON KABUSHIKI KAISHA, Tokyo (JP)

(72) Inventor: Hideyuki Ikegami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/342,780

(22) Filed: Nov. 3, 2016

(65) Prior Publication Data

US 2017/0134627 A1    May 11, 2017

(30) Foreign Application Priority Data

Nov. 9, 2015  (JP) ................. 2015-219914

(51) Int. Cl.
| | | |
|---|---|---|
| H04N 5/232 | (2006.01) | |
| H04N 5/225 | (2006.01) | |
| G06T 7/60 | (2017.01) | |
| G06T 7/00 | (2017.01) | |

(52) U.S. Cl.
CPC .......... *H04N 5/23206* (2013.01); *G06T 7/60* (2013.01); *H04N 5/2257* (2013.01); *H04N 5/23245* (2013.01); *H04N 5/23296* (2013.01)

(58) Field of Classification Search
CPC .......... H04N 5/23206; H04N 5/23296; H04N 5/23245; H04N 5/2257; G06T 7/60
See application file for complete search history.

(56) References Cited

U.S. PATENT DOCUMENTS

| | | | | |
|---|---|---|---|---|
| 7,148,914 | B2 * | 12/2006 | Bronson | G08B 13/19663 348/207.1 |
| 7,956,891 | B2 * | 6/2011 | Uchihara | H04N 5/232 348/143 |
| 9,532,008 | B2 * | 12/2016 | Ohnishi | G03B 21/26 |
| 2001/0045983 | A1 * | 11/2001 | Okazaki | H04L 63/101 348/211.99 |
| 2004/0201677 | A1 * | 10/2004 | Bronson | G08B 13/19663 348/207.1 |
| 2012/0007999 | A1 * | 1/2012 | Horii | H04N 5/232 348/211.4 |
| 2012/0092496 | A1 * | 4/2012 | Kozakura | G08B 13/19656 348/143 |
| 2012/0293654 | A1 * | 11/2012 | Ikegami | H04N 5/23206 348/143 |
| 2013/0342712 | A1 * | 12/2013 | Kozakura | H04N 5/23222 348/207.11 |
| 2014/0002708 | A1 * | 1/2014 | Kohno | H04N 5/232 348/333.02 |
| 2014/0092262 | A1 * | 4/2014 | Otsuka | H04N 5/23206 348/207.1 |

(Continued)

FOREIGN PATENT DOCUMENTS

| | | |
|---|---|---|
| JP | 2008-131387 A | 6/2008 |
| JP | 2013-030921 A | 2/2013 |

*Primary Examiner* — Shahbaz Nazrul
(74) *Attorney, Agent, or Firm* — Canon USA Inc., IP Division

(57) ABSTRACT

An acquisition unit acquires an image of a partial region which is a portion of an image captured by an imaging unit. During a time in which the image of the partial region is acquired by the acquisition unit, a control unit performs control to restrict operations of driving units for changing an imaging range of the imaging unit.

16 Claims, 14 Drawing Sheets

(56) References Cited

U.S. PATENT DOCUMENTS

2014/0293071 A1* 10/2014 Akaishi .............. H04N 5/23206
348/207.11
2016/0142639 A1* 5/2016 Kimura .............. H04N 5/23296
348/240.3
2016/0277662 A1* 9/2016 Ashitani ................ H04N 5/232

* cited by examiner

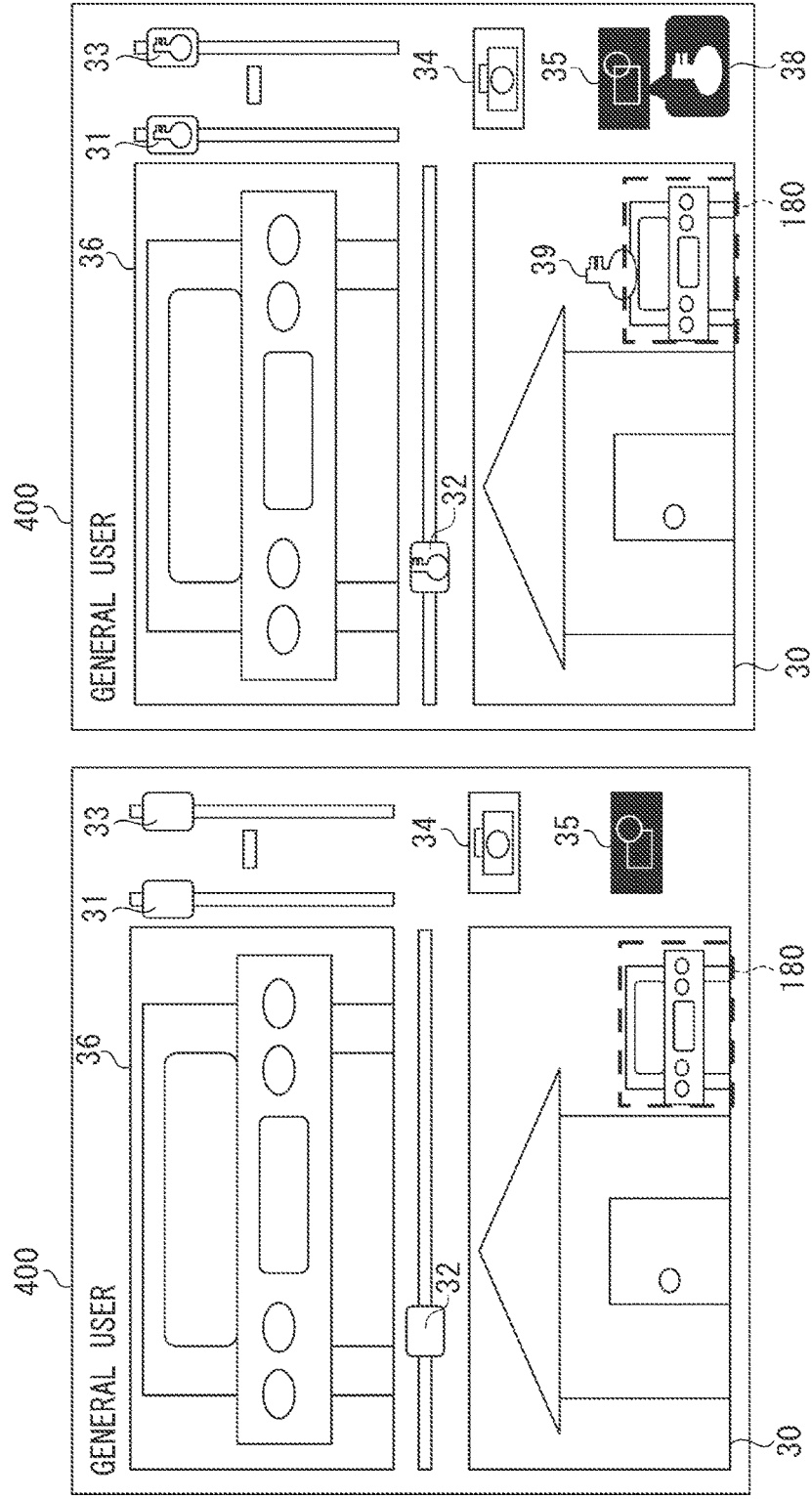

CONTROL APPARATUS, CONTROL METHOD, AND RECORDING MEDIUM

BACKGROUND OF THE INVENTION

Field of Invention

The present invention relates to a technique for controlling an imaging apparatus.

Description of Related Art

Conventionally, an image of a partial region in an image captured by an imaging apparatus is clipped and displayed. A known imaging apparatus is capable of physically moving (driving) the imaging apparatus in the pan direction and in the tilt direction. Another known imaging apparatus is capable of zooming in (enlarging) or zooming out (reducing) an imaging range by driving an optical lens of the imaging apparatus.

Japanese Patent Application Laid-Open No. 2008-131387 discusses an imaging apparatus capable of performing PTZ (pan, tilt, and zoom) drive. In the above Japanese Patent Application, when an image is being clipped, the imaging apparatus is controlled to move the clipping position of the image according to PTZ drive so that the clipping position remains unchanged even if PTZ drive is performed.

In the conventional technique, however, if the imaging direction of the imaging apparatus is physically moved or the imaging range is optically changed, a user who has set an image clipping range may suddenly become unable to obtain a desired image.

SUMMARY OF THE INVENTION

To reduce the possibility that a user who has set an image clipping range unintentionally becomes unable to obtain a desired image, for example, a control apparatus has the following configuration.

According to an aspect of the present invention, a control apparatus includes, an acquisition unit configured to acquire an image of a partial region which is a portion of an image captured by an imaging unit, and a control unit configured to perform control to restrict operations of driving units for changing an imaging range of the imaging unit during a time in which the image of the partial region is acquired by the acquisition unit.

Further features of the present invention will become apparent from the following description of exemplary embodiments with reference to the attached drawings.

BRIEF DESCRIPTION OF THE DRAWINGS

FIGS. 8A and 8B illustrate examples of a display screen of the display control apparatus displayed when image clipping is performed, according to the first exemplary embodiment.

DESCRIPTION OF THE EMBODIMENTS

Figure 1:
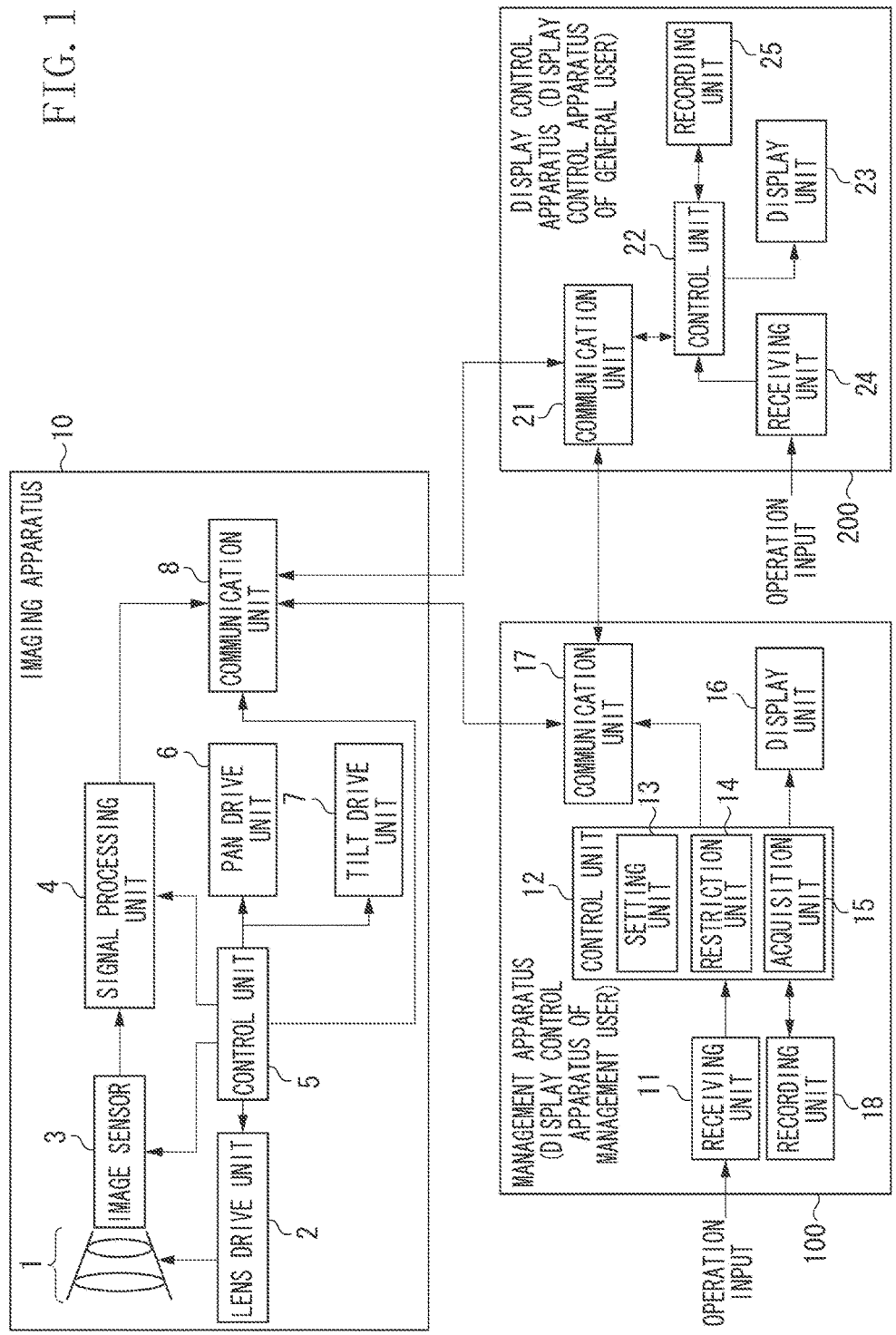
FIG. 1 is a functional block diagram illustrating an imaging apparatus, a management apparatus (control apparatus), and a display control apparatus according to each exemplary embodiment.

Exemplary embodiments of the present invention will be described in detail below with reference to the accompanying drawings. Configurations described in the following exemplary embodiments are to be considered as illustrative, and the present invention is not limited to the configurations according to the following exemplary embodiments. For example, although, in each exemplary embodiment, an imaging apparatus, a management apparatus (a control apparatus), and a display control apparatus (a display control apparatus of a general user) are separate units, these apparatuses may be arbitrarily combined or integrally formed as one unit. Further, another apparatus may have one or a plurality of configurations of any one of the imaging apparatus, the management apparatus, and the display control apparatus has. As an example, the management apparatus is a display control apparatus of a management user. The management user is able to set a larger number of settings related to an imaging apparatus 10 and images captured by the imaging apparatus 10 than the general user is.

Processing for clipping a portion (partial region) of an image captured by the imaging apparatus 10 is referred to as clipping processing. The clipping processing may include processing for extracting (clipping) from captured image data the image of the partial region in the captured image and adjusting the clipped image to the display size of a display unit 16. The clipping processing may also include processing for displaying the clipped image of the partial region on the display unit 16 and processing for transmitting the clipped captured image data of the partial region to another display control apparatus. The clipping processing may be processing for acquiring at least the image of the partial region. In the following descriptions, the clipping mode refers to a mode in which the above-described clipping processing is performed. In the clipping mode, an acquisition unit 15 may continuously acquire the image of the partial region or may acquire the image of the partial region at periodical intervals (for example, at 1-second or fraction-of-a-second intervals).

A captured image is assumed to be a captured image in an area larger than the partial region to be clipped. More specifically, a captured image means a clipping source image. A captured image does not need to include all of pixels output from an image sensor 3, and may be, for example, an electronically zoomed image.

Each apparatus according to the first exemplary embodiment will be described below. In each exemplary embodiment, the imaging apparatus 10, a management apparatus 100, and a display control apparatus 200 can communicate with each other via a wired or wireless network. There may be a plurality of respective apparatuses. To simplify description, the following examples will be described on the premise that there is one of each of the respective apparatuses.

A network to be used for communication may be any type of digital network, such as the Internet and an intranet, which can ensure bands for enabling transmission and reception of control commands (described below) and captured images. In the present exemplary embodiment, the Transmission Control Protocol/Internet Protocol (TCP/IP) (User Datagram Protocol/Internet Protocol (UDP/IP)) will be described below as an example of a network protocol. In this case, the address of the TCP/IP protocol is an IP address. Each of the imaging apparatus 10, the management apparatus 100, and the display control apparatus 200 is assumed to be assigned an IP address.

The imaging apparatus 10 according to each exemplary embodiment will be described below with reference to FIG. 1. The imaging apparatus 10 includes an optical member 1 (including one or a plurality of optical lenses), a lens drive unit 2, an image sensor 3, a signal processing unit 4, a control unit 5, a pan drive unit 6, a tilt drive unit 7, and a communication unit 8.

The image sensor 3 receives focused light via the optical member 1 and converts the received light into electric charges to generate an imaging signal. As the image sensor 3, for example, a Complementary Metal Oxide Semiconductor (CMOS) image sensor may be used. A Charge Coupled Device (CCD) image sensor may also be used as the image sensor 3.

Under control of the control unit 5, the lens drive unit 2 physically drives the optical member 1. Specifically, the lens drive unit 2 drives the optical member 1 by using a motor to perform optical zoom in (enlargement) or zoom out (reduction) to change the imaging range which is the range of a subject image to be formed on the image sensor 3.

The signal processing unit 4 digitizes the imaging signal converted by the image sensor 3 to generate captured image data. The signal processing unit 4 may perform compressing and encoding on the image data to generate compressed and encoded captured-image data.

Under control of the control unit 5, the communication unit 8 transmits the captured image data generated by the signal processing unit 4 to the management apparatus 100 and the display control apparatus 200. The communication unit in each apparatus can be implemented, for example, by a network interface.

The communication unit 8 receives control commands transmitted from the management apparatus 100 and the display control apparatus 200. In response to an operation input to the management apparatus 100 by the management user, a control command is generated by a control unit 12 of the management apparatus 100 and transmitted by a communication unit 17 of the management apparatus 100. For example, control commands are commands conforming to the Open Network Video Interface Forum (ONVIF) standard (ONVIF is a registered trademark of ONVIF, Inc.). Under control of the control unit 5, the communication unit 8 also transmits a response command indicating completion of an operation by a control command to the management apparatus 100 and the display control apparatus 200.

When the communication unit 8 receives a control command from the management apparatus 100 or the display control apparatus 200, the control unit 5 performs control according to the control command. The control command is generated, for example, based on an operation input by a user of the management apparatus 100 or the display control apparatus 200.

For example, when the communication unit 8 receives a control command for instructing to perform lens drive, the control unit 5 instructs the lens drive unit 2 to drive the optical lens of the optical member 1 to perform zoom-in or zoom-out based on the control command (zoom drive). The zoom operation (zoom-in or zoom-out) to be performed and the amount of zoom are indicated in the control command. Under control of the control unit 5, the lens drive unit 2 drives the optical member 1 including a focal lens and a zoom lens. The lens drive unit 2 includes a drive system and a motor as a drive source thereof.

Figure 2:
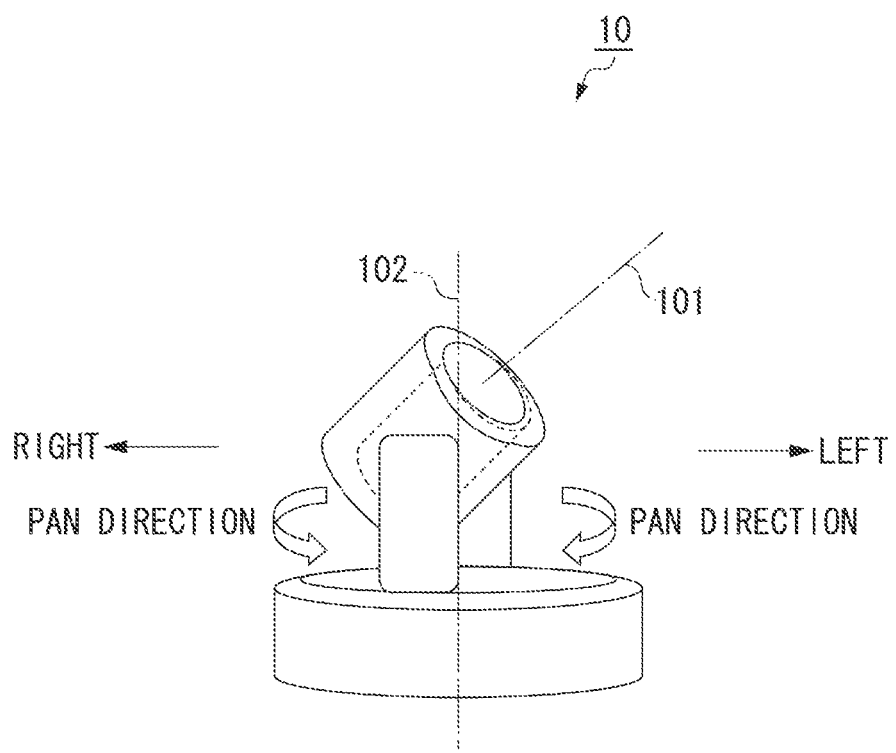
FIG. 2 illustrates an external view of the imaging apparatus according to each exemplary embodiment.

When the communication unit 8 receives a control command for instructing to perform pan drive, the control unit 5 controls the pan drive unit 6 to change the imaging direction of the imaging apparatus 10 to the pan direction based on the control command (pan drive). The change direction and the amount of change are indicated in the control command. The pan drive unit 6 includes a mechanical drive system and a motor serving as a drive source thereof and physically changes the imaging direction. As illustrated in FIG. 2, as an example, the pan drive unit can rotate an imaging direction 101 of the imaging apparatus 10 by 360 degrees in the pan direction centering on a pan axis 102.

Figure 3:
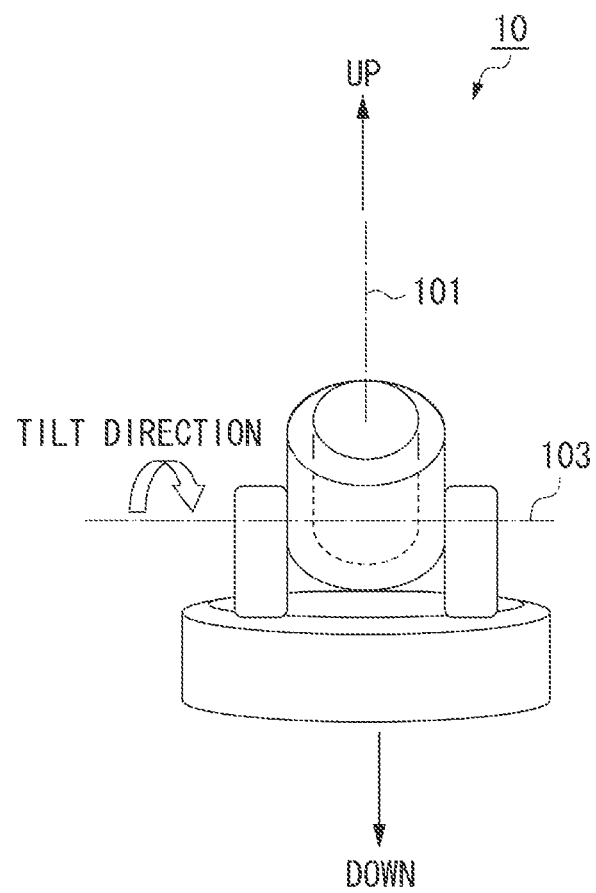
FIG. 3 illustrates an external view of the imaging apparatus according to each exemplary embodiment.

When the communication unit 8 receives a control command for instructing to perform tilt drive, the control unit 5 controls the tilt drive unit 7 to change the imaging direction of the imaging apparatus 10 to the tilt direction based on the control command (tilt drive). The change direction and the amount of change are indicated by the control command. The tilt drive unit 7 includes a mechanical drive system and a motor serving as a drive source thereof and physically changes the imaging direction. As illustrated in FIG. 3, as an example, the tilt drive unit 7 can rotate the imaging direction 101 of an imaging apparatus 10 by 180 degrees in the tilt direction centering on a tilt axis 103.

The management apparatus 100 according to each exemplary embodiment will be described below with reference to FIG. 1. For example, the management apparatus 100 and the display control apparatus 200 can be implemented by using personal computers.

Under control of the control unit 12, the communication unit 17 transmits a control command for instructing to drive each drive unit to the imaging apparatus 10. Under control of the control unit 12, the communication unit 17 transmits a transmission request control command for requesting to transmit a captured image to the imaging apparatus 10. In response to the transmission request control command, the communication unit 17 further receives captured image data transmitted from the imaging apparatus 10.

The acquisition unit 15 acquires captured image data via the communication unit 17. In the clipping mode, the acquisition unit 15 also performs clipping processing for clipping (acquiring) the image of the partial region from the captured image data. In addition, the control unit 5 of the imaging apparatus 10 may perform the clipping processing in advance and transmit the clipped image of the partial region to the management apparatus 100. In this case, the image data of the partial region is transmitted from the imaging apparatus 10, and the acquisition unit 15 will acquire the image data of the partial region via the communication unit 17.

The control unit 12 displays on the display unit 16 the captured image data acquired by the acquisition unit 15 and the image data of the partial region. The control unit 12 displays graphical user interfaces (GUIs) as illustrated in FIGS. 4A, 4B, 6A, and 6B on the display unit 16. The display unit of each apparatus can be implemented by a display device which uses a liquid crystal panel or an organic electroluminescence (EL) panel.

When necessary, the control unit 12 transmits the captured image data acquired by the acquisition unit 15 and the image data of the partial region to the display control apparatus 200 via the communication unit 17.

When necessary, the control unit 12 may perform encoding on the captured image data acquired by the acquisition unit 15 and the image data of the partial region. The control unit 12 may instruct a recording unit 18 to record image data. The recording unit 18 can be implemented by diverse types of recording media such as a secure digital (SD) memory card, a hard disk drive (HDD) and an optical disc.

When the control unit 12 receives authentication information for requesting authentication as a management user from other display control apparatus via the communication unit 17, the control unit 12 determines whether to permit authentication.

There are two different user types: management users and general users who are permitted to execute different functions and set different items. The control unit 12 compares a character string such as an identifier (ID) and a password input by the user with a user ID and a password of the management user recorded in the recording unit 18 and, when the IDs and passwords are matched, authenticates the user as a management user. For example, when the management user accesses the display control apparatus 100 from other display control apparatus, the management user is able to execute functions and settings equivalent to the management apparatus 100 from the display control apparatus. The display control apparatus 200 is a display control apparatus which is authenticated not as a management user but as a general user by the control unit 18.

A receiving unit 11 receives an operation input by a user via a mouse and a keyboard. Then, the control unit 12 generates the above-described various control commands based on operation inputs received by the receiving unit 11. The control unit 12 further instructs the communication unit 17 to transmit generated control commands to the imaging apparatus 10. A setting unit 13 and a restriction unit (control unit) 14 will be described below.

The display control apparatus 200 will be described below with reference to FIG. 1. Although the display control apparatus 200 is a display control apparatus of the general user, it can be operated as the management apparatus 100 when the management user logs in. The display control apparatus 200 to which a general user logs in will be described below. The display control apparatus 200 can perform almost similar processing to that of the management apparatus 100 except for processing by the setting unit 13 and the restriction unit 14 (described below). The display unit 23 may be provided outside the display control apparatus 200.

Under control of the control unit 22, a communication unit 21 transmits a transmission request control command for requesting to transmit a captured image to the imaging apparatus 10 or the management apparatus 100. The communication unit 21 also receives captured image data transmitted from the imaging apparatus 10 or the management apparatus 100 in response to the transmission request control command.

The control unit 22 acquires captured image data and the image data of the partial region via the communication unit 21. The control unit 22 displays an image based on the acquired captured image data and the image data of the partial region on the display unit 23.

The control unit 22 may instruct the storage unit 25 to record image data. The recording unit 25 can be implemented by diverse types of recording media such as a secure digital (SD) memory card, a hard disk drive (HDD), an optical disc, etc.

The receiving unit 24 receives an operation input by the user via a mouse and a keyboard. Then, the control unit 22 generates various control commands based on operation inputs received by the receiving unit 24. The control unit 22 further instructs the communication unit 21 to transmit the generated control commands to the imaging apparatus 10 and the management apparatus 100.

Figure 4A:
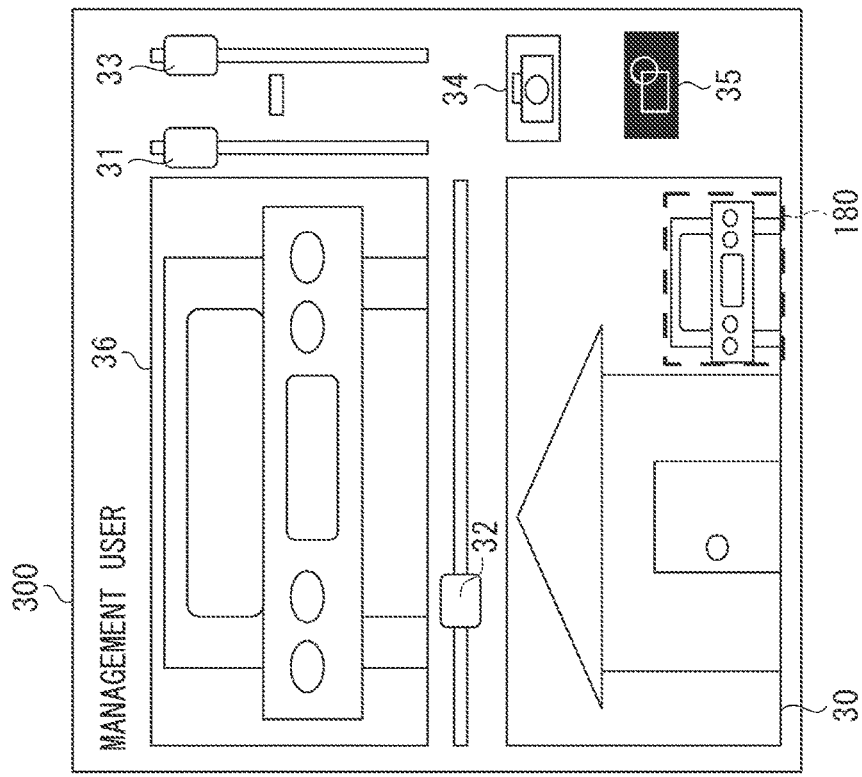
FIGS. 4A and 4B illustrate examples of a display screen of the management apparatus.
Figure 4B:
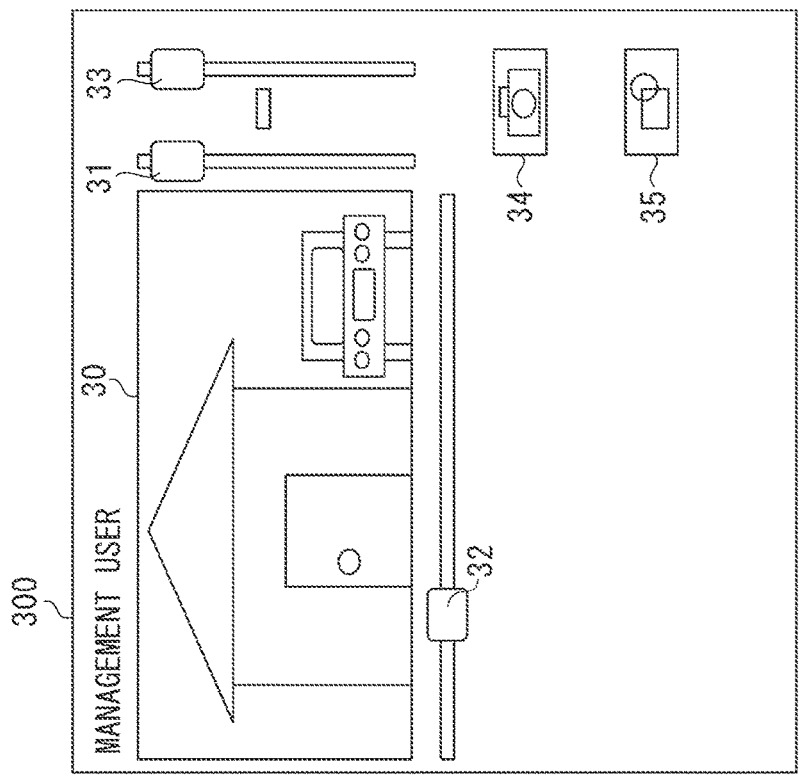

Operations of the management apparatus 100 according to the first exemplary embodiment will be described below with reference to FIGS. 4A and 4B. FIGS. 4A and 4B illustrate examples of a display screen 300 displayed on the display unit 16 of the management apparatus 100.

FIG. 4A illustrates an example of the display screen 300 of the management apparatus 100 when the clipping processing is not performed. Under control of the control unit 12, a captured image 30 is displayed on the display screen 300 illustrated in FIG. 4A. As an example, the captured image 30 is a moving image. Under control of the control unit 12, a tilt slider 31, a pan slider 32, and a zoom slider 33 are displayed on the display screen 300. These sliders are GUIs. The user is able to instruct the imaging apparatus 10 to perform PTZ drive by moving these sliders 31, 32, and 33 via a touch panel and a mouse (not illustrated).

More specifically, the tilt slider 31 allows the user to drive the tilt drive unit 7 of the imaging apparatus 10 in an arbitrary direction. For example, when the user moves up the tilt slider 31 via an operation input, the control unit 12 generates a control command for performing an upward tilt drive. When the user moves down the tilt slider 31 via an operation input, the control unit 12 generates a control command for performing a downward tilt drive. The control unit 12 further determines the amount of tilt drive according to the amount of movement of the tilt slider 31. The state where the tilt slider 31 is positioned at the uppermost position corresponds to the state where the imaging direction 101 is directed to the uppermost direction (upward direction in the captured image). The state where the tilt slider 31 is positioned at the lowermost position corresponds to the state where the imaging direction 101 is directed to the lowermost direction (downward direction in the captured image).

The pan slider 32 allows the user to drive the pan drive unit 6 of the imaging apparatus 10 in an arbitrary direction. For example, when the user moves the pan slider 32 to the right via an operation input, the control unit 12 generates a control command for performing a rightward pan drive. When the user moves the pan slider 32 to the left via an operation input, the control unit 12 generates a control command for performing a leftward pan drive. The control unit 12 further determines the amount of pan driven according to the amount of movement of the pan slider 32.

The zoom slider 33 allows the user to drive the optical member 1 in an arbitrary direction via the lens drive unit 2 of the imaging apparatus 10. For example, when the user moves up the zoom slider 33 via an operation input, the control unit 12 generates a control command for performing a zoom-in operation from the current condition. When the user moves down the zoom slider 33 via an operation input, the control unit 12 generates a control command for performing a zoom-out operation from the current condition. The control unit 12 further determines the amount of zoom according to the amount of movement of the zoom slider 33.

The control unit 12 transmits thus-generated control commands to the imaging apparatus 10 via the communication unit 17. The imaging apparatus 10 performs operations according to control commands transmitted from the management apparatus 100.

GUIs using sliders are examples, and GUIs using buttons are also applicable. Physical sliders and buttons are also applicable.

Under control of the control unit 12, a snapshot button 34 and a clipping button 35 are displayed on the display screen 300. The snapshot button 34 is used to acquire a still image. The clipping button 35 is used to set the clipping mode which is a mode in which clipping processing is performed. GUIs using buttons may be examples, and arbitrarily shaped GUIs are also applicable. Physical buttons are also applicable.

FIG. 4B illustrates the display screen 300 which is displayed when the user selects the clipping button 35 via an operation input by the user in the state illustrated in FIG. 4A. The clipping button 35 is displayed in black-and-white inversion to indicate that the clipping mode is currently selected. The black-and-white inverted display is an example, and the display pattern in the clipping mode needs only to be different from that in the non-clipping mode. The control unit 12 may also display information indicating that the clipping mode is currently selected.

In the clipping mode, the control unit 12 superimposes a frame 180 for indicating a clipping range (partial region) onto the captured image 30. The user is able to set a clipping range by specifying the position and size of the frame 180. An image 36 of the partial region corresponding to the frame 180 is displayed on the display screen 300.

Figure 5:
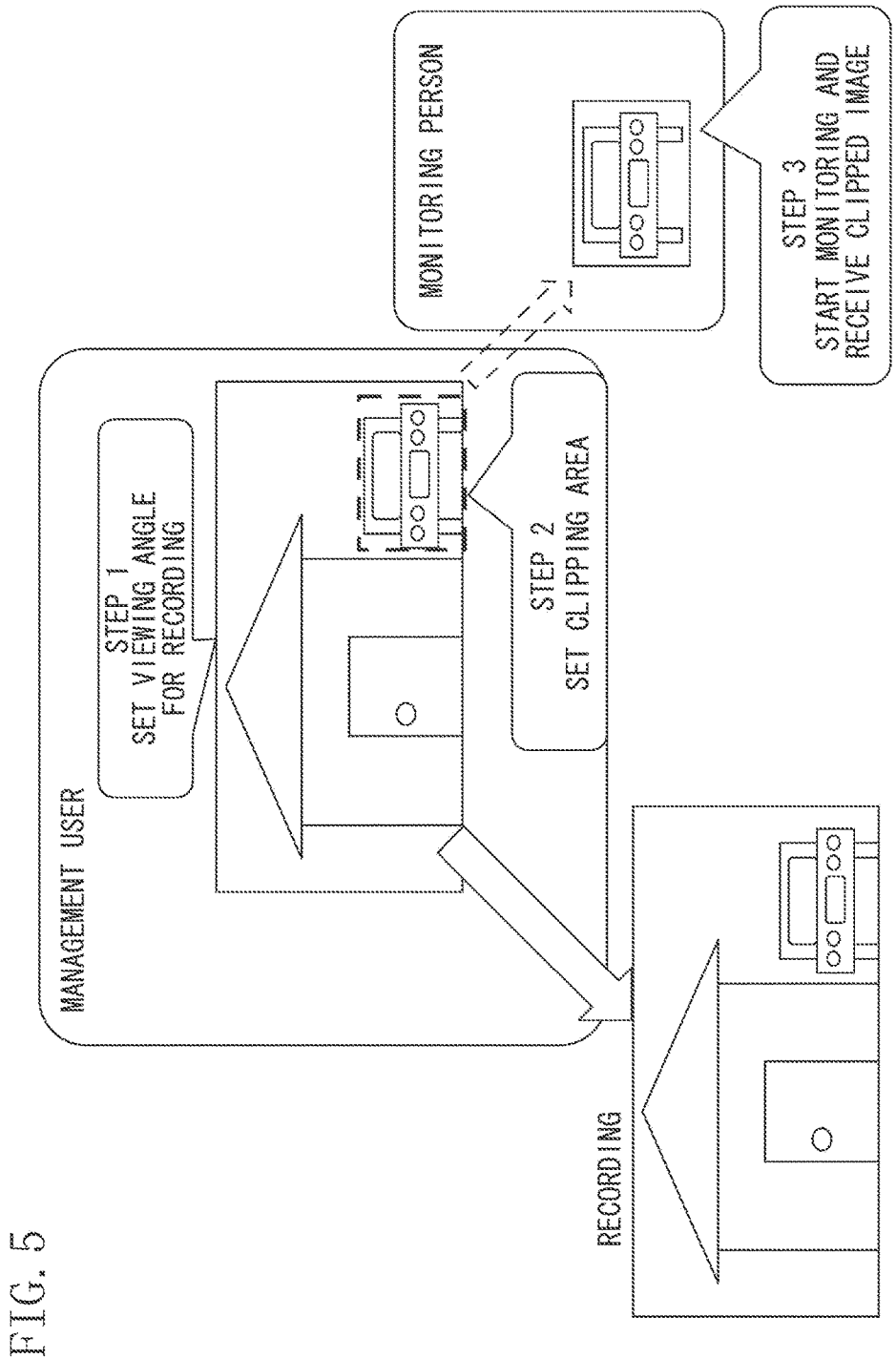
FIG. 5 is a conceptual view illustrating functions of the management apparatus.

This clipping processing may be used as illustrated in the conceptual view illustrated in FIG. 5. Specifically, the management user sets the viewing angle of the imaging apparatus 10 for recording a captured image (step 1). Then, the management user sets a partial region (clipping area) which should be particularly noticed (step 2). The management user or other user (for example, a general user) monitors the image of the partial region set by the management user (clipped image). There is a case where the imaging apparatus 10 monitors a partial region which should be noticed while recording a captured image in this way. The imaging apparatus 10 is able to prevent areas other than the partial region from being monitored by a monitoring person (for example, a general user) by allowing the monitoring person to monitor only the partial region.

Figure 6A:
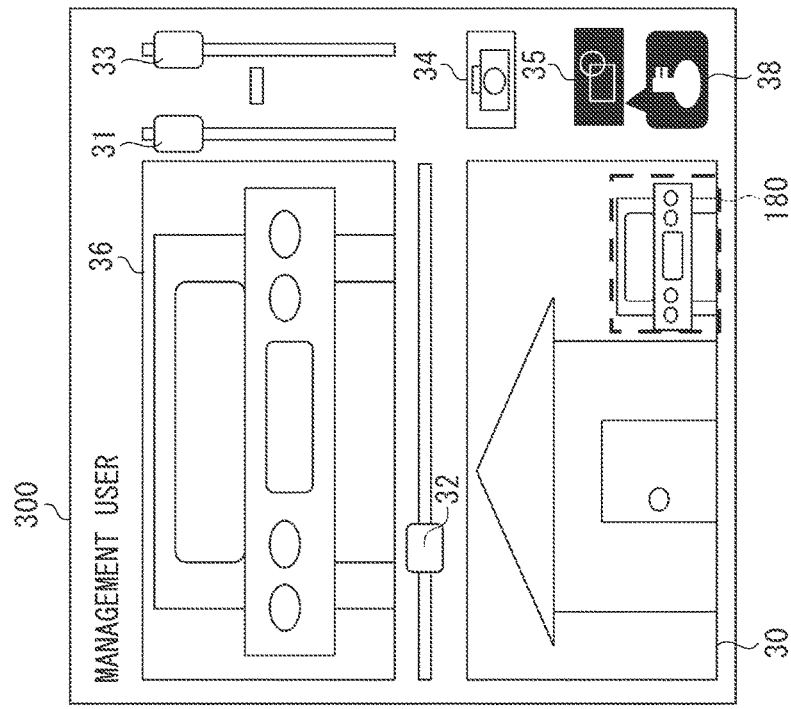
FIGS. 6A and 6B illustrate examples of a display screen of the management apparatus displayed when image clipping is performed, according to the first exemplary embodiment.

Operations of the setting unit 13 will be described below with reference to FIG. 6A illustrating an example of the display screen 300 of the management apparatus 100 in the clipping mode. In the clipping mode, the control unit 12 displays the current captured image 30 and the image 36 of the current partial region on the display unit 16. Although, in the example, a predetermined area is clipped immediately after the clipping mode is entered, any portion may not be clipped before the user specifies a partial region.

When the user moves the frame 180 or changes the size of the frame 180 via an operation input, the setting unit 13 sets the area corresponding to the frame 180 as a partial region. For example, the setting unit 13 acquires coordinates corresponding to the frame 180 in the captured image 30 and sets the coordinate position as a partial region. In the coordinate system, for example, the position at the upper left corner of the captured image 30 may be used as an origin. The setting unit 13 may set a partial region regardless of an operation input by the user. For example, the control unit 12 may perform pattern matching processing to detect a specific object (a person, etc.) from the captured image 30, and the setting unit 13 may set the area corresponding to the specific object (detection result) as a partial region. In this way, the control unit 12 is also provided with an object detection function of detecting a specific object.

After a partial region is set by the management user, the control unit 12 may transmit the image data of the partial region to the display control apparatus 200 of the general user via the communication unit 17. Alternatively, the control unit 12 may transmit to the display control apparatus 200 of the general user a command for acquiring image data of the set partial region from the imaging apparatus 10. This instruction command includes, for example, coordinate information indicating the position of the partial region. The display control apparatus 200 of the general user is able to execute the clipping mode based on the coordinate information.

The setting unit 13 moves a position 180 of the partial region with respect to the captured image 30 according to changing of the imaging range of the imaging apparatus 10 by any one of the drive units 2, 6, and 7. Specifically, when the area corresponding to a predetermined subject included in the captured image 30 is set as a partial region, the setting unit 13 performs the following processing when the imaging range of the imaging apparatus 10 is changed by any one of the drive units 2, 6, and 7. Specifically, the setting unit 13 moves the position 180 of the partial region in the captured image 30 to the area corresponding to the predetermined subject in the captured image 30 after the imaging range is changed by the drive unit. Specifically, the setting unit 13 changes the position of the partial region so that the same subject is to be constantly clipped. For example, when the setting unit 13 sets the imaging range to the left, the position of the subject currently being clipped moves relatively to the left in the captured image 30. Accordingly, the setting unit 13 also moves the position of the partial region to the left.

Then, the acquisition unit 15 clips (acquires) the image of the partial region set from captured image data. The control unit 5 of the imaging apparatus 10 may perform the clipping processing. In that case, the imaging apparatus 10 will transmit the image data of the partial region, and the acquisition unit 15 will acquire the image data of the partial region via the communication unit 17.

Then, as illustrated in FIG. 6A, the control unit 12 displays on the display unit 16 the image 36 of the partial region acquired by the acquisition unit 15.

The restriction mode will be described below with reference to FIG. 6B. The restriction mode can be set during the clipping mode, and refers to a mode in which the restriction unit 13 performs control to restrict operations of the drive units 2, 6, and 7 for changing the imaging range in the imaging apparatus 10.

According to the present exemplary embodiment, the drive units for changing the imaging range refer to at least either one of the pan drive unit 6, the tilt drive unit 7, and the lens drive units 2. Specifically, PTZ drive means operations for changing the imaging range. In addition, the drive units need only to be means for changing the range of the subject to be captured by the image sensor 3. The purpose of providing such a restriction mode is to prevent a situation where the currently clipped area is no longer captured by the imaging apparatus 10 because of PTZ drive. Since the currently clipped area is an area currently being particularly noticed by the management user, a situation where the image in this area cannot be acquired is not desirable in the clipping mode. For this reason, the restriction mode is executed.

Figure 6B:
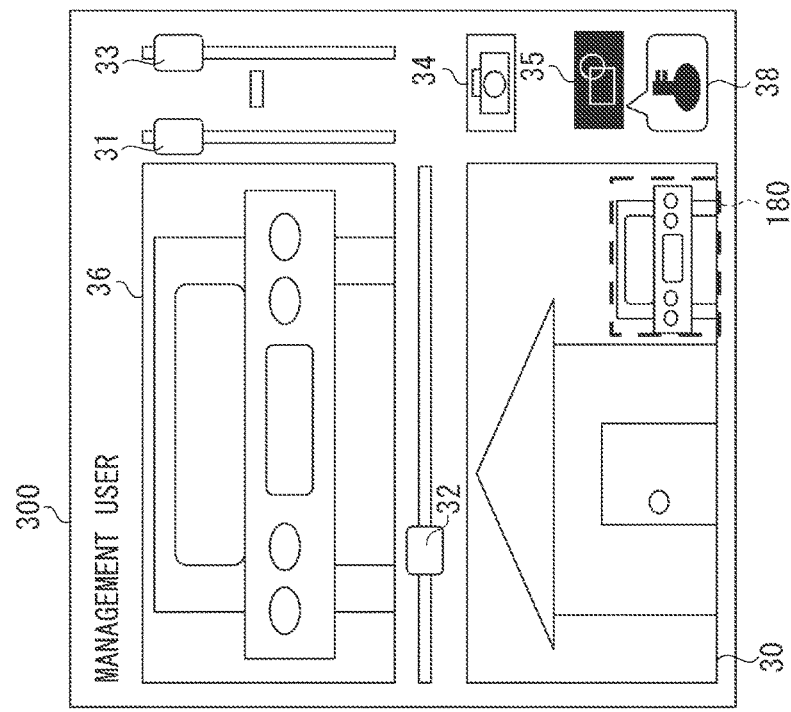

In the clipping mode, the control unit 12 displays a restriction button 38 on the display unit 16, as illustrated in FIGS. 6A and 6B. When the user selects the restriction button 38, the restriction unit 14 restricts operations of the drive units for changing the imaging range. Instead of providing the restriction button 38, the restriction unit 14 may execute the restriction mode each time the clipping mode is entered.

Referring to FIG. 6A, since the restriction button 38 is not selected, the restriction button 38 is not in the selective state. In this state, since the restriction by the restriction unit 14 is not executed, the management user and the general user are able to perform PTZ drive.

FIG. 6B illustrates a state where the restriction button 38 is selected by the user. When the restriction button 38 is selected, the restriction unit 14 restricts operations of the drive units. Further, to indicate that the restriction mode is currently selected, the control unit 12 displays the restriction button 38 in black-and-white inversion. The black-and-white inverted display is an example, and the display pattern in the restriction mode needs only to be different from that in the non-restriction mode. Further, the control unit 12 may display information indicating that the restriction mode is currently selected.

In the restriction mode, the restriction unit 14 controls operations of the drive units in a restrictive way. Methods for restricting operations of the drive units include the following methods.

For example, to restrict operations caused by the management apparatus 100 and the display control apparatus 200, the restriction unit 13 transmits a control command for requesting to inhibit PTZ drive to the imaging apparatus 10. In response to the control command, the control unit 5 of the imaging apparatus 10 does not perform PTZ drive even upon reception of a control command for instructing to perform PTZ drive from the management apparatus 100 and the display control apparatus 200.

In a system in which only the management apparatus 100 is able to transmit a control command to perform PTZ drive to the imaging apparatus 10, the following processing is possible.

Specifically, the restriction unit 13 needs only to prevent the imaging apparatus 10 from transmitting a control command for instructing to perform PTZ drive to the imaging apparatus 10 even upon an input of an operation for instructing to perform PTZ drive. Alternatively, the restriction unit 13 needs only to prevent display of a GUI for instructing to perform PTZ drive. Alternatively, the restriction unit 13 needs only to prevent a change of a GUI for instructing to perform PTZ drive. The restriction unit 13 needs only to adopt at least one of these methods.

Although, in the above-described example, the management user cannot perform PTZ drive until the restriction button 38 is selected again to cancel the restriction mode, the following processing is also possible. More specifically, the management user may be able to perform PTZ drive even in the restriction mode. If an operation is performed by the management user who has executed the restriction mode, it can be determined that the management user approves that the partial region will not be captured.

A display screen 400 of the display control apparatus 200 of the general user in the restriction mode will be described below with reference to FIGS. 7A and 7B.

Figure 7A:
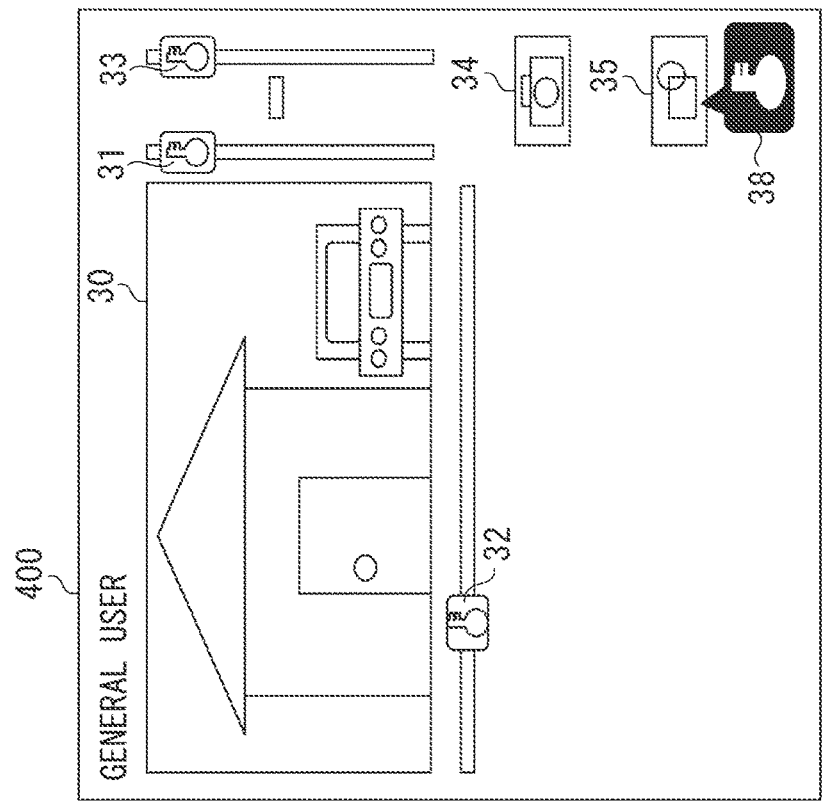
FIGS. 7A and 7B illustrate examples of a display screen of the display control apparatus displayed when image clipping is not performed, according to the first exemplary embodiment.

FIG. 7A illustrates the display screen 400 of the display control apparatus 200 in the non-restriction mode. Referring to the example illustrated in FIG. 7A, it is possible to perform PTZ drive by using the tilt slider 31, the pan slider 32, and the zoom slider 33 similar to the display screen 300 of the management apparatus 10. The functions corresponding to the clipping mode button 35 and the snapshot button 34 are similar to those of the management apparatus 100. The general user may not execute the clipping mode.

Figure 7B:
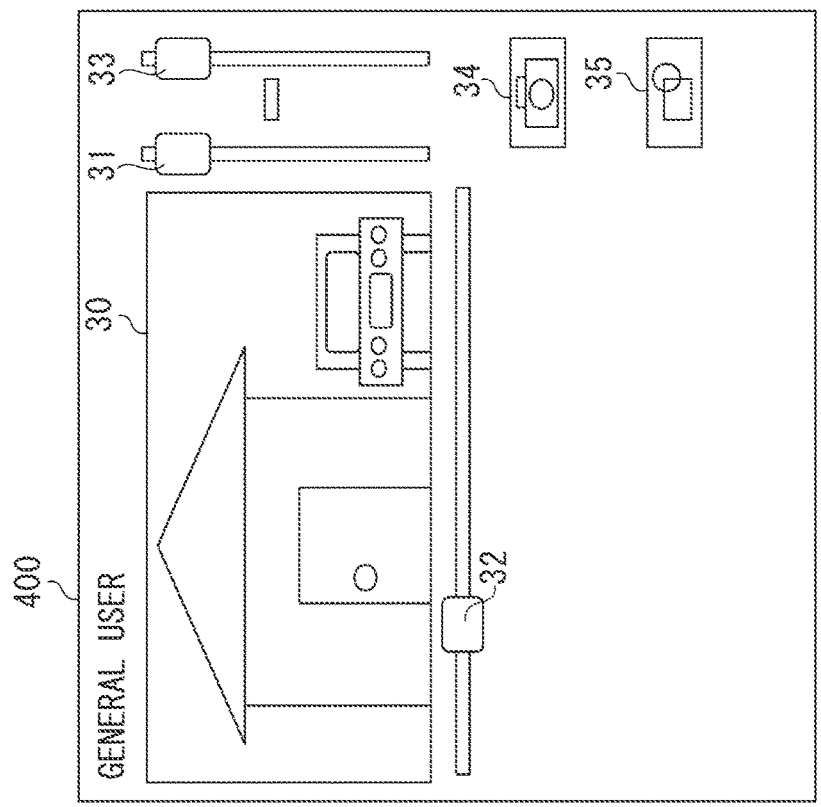

FIG. 7B illustrates the display screen 400 of the display control apparatus 200 in the restriction mode. To indicate that restriction is made for the clipping button 35, the control unit 22 displays the restriction button 38 on the display unit 23. However, the restriction button 38 illustrated in FIG. 7B indicates that the restriction mode is currently selected, and cannot be operated by the general user. The control unit 22 changes the display screen 400 to a GUI having a key mark so that the user recognizes that the tilt slider 31, the pan slider 32, and the zoom slider 33 are currently restricted.

The display control apparatus 200 periodically makes an inquiry to the management apparatus 100 about whether the restriction mode is selected. Upon reception of information indicating that the restriction mode is selected, the control unit 22 changes the display screen 400 to a display screen as illustrated in FIG. 7B.

FIG. 8A illustrates the display screen 400 of the display control apparatus 200 displayed when the clipping mode is executed by the general user. The restriction button 38 is not displayed since the restriction mode cannot be selected by the general user. FIG. 8B illustrates the display screen 400 of the display control apparatus 200 displayed when the restriction mode is executed by the management user. Similar to FIG. 7B, each GUI has a display pattern indicating the restriction mode. Under control of the control unit 22, an icon 39 indicating that the restriction mode is currently selected is displayed.

Figure 9:
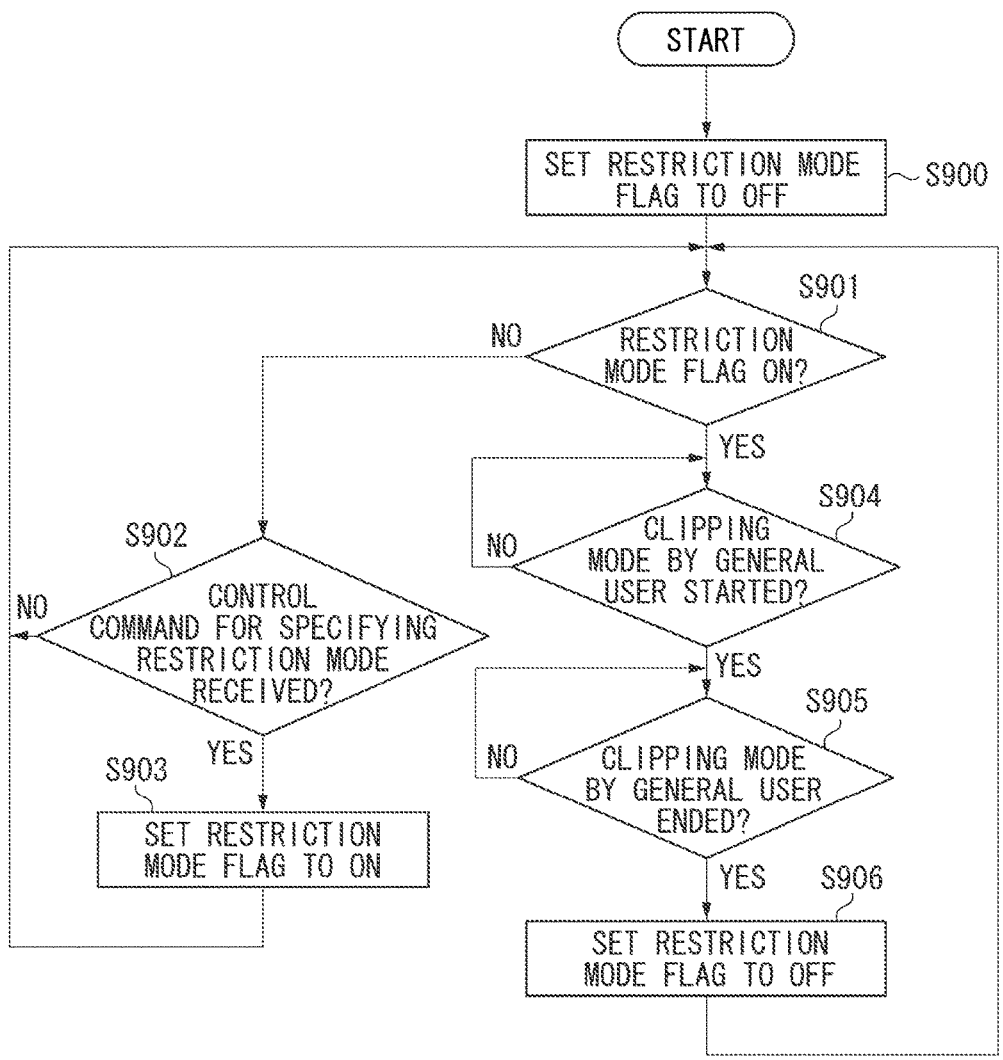
FIG. 9 is a flowchart illustrating a timing of starting a restriction mode and a timing of ending the restriction mode.

An example of the timing of starting the restriction mode and the timing of ending the restriction mode will be described below with reference to the flowchart illustrated in FIG. 9. As an example, FIG. 9 assumes a situation where a monitoring person (general user) monitors the image of the partial region set by the management user. As an example, FIG. 9 illustrates processing of the imaging apparatus 10 to execute restriction of PTZ drive. This processing is started when the imaging apparatus 10 is activated.

In step S900, the control unit 5 initializes a restriction mode flag for indicating whether the restriction mode is currently selected. More specifically, the control unit 5 sets the flag to OFF which indicates that the restriction mode is not currently selected.

In step S901, the control unit 5 determines whether the restriction mode flag is ON which indicates that the restriction mode is currently selected. When the control unit 5 determines that the restriction mode flag is OFF (NO in step S901), the processing proceeds to step S902. In the initial state, at S900, the flag is initialized (OFF).

In step S902, the control unit 5 determines whether a control command for instructing to select the restriction mode is received from the management apparatus 100.

When the control unit 5 determines that a control command for specifying the restriction mode is not received (NO in step S902), the processing returns to step S901 and repeats steps S901 and S902 until a control command for specifying the restriction mode is received.

On the other hand, when the control unit 5 determines that a control command for specifying the restriction mode is received (YES in step S902), the processing proceeds to step S903. For example, in the management apparatus 100, when the user selects the restriction button 38, the restriction unit 14 of the management apparatus 100 transmits a control command for specifying the restriction mode. In this case, the restriction unit 14 transmits a control command for instructing to select the restriction mode to restrict PTZ drive. Only the management user can instruct to select the restriction mode.

In step S903, the control unit 5 sets the restriction mode flag to ON and executes the restriction mode, and the processing returns to step S901. Therefore, when the control unit 5 determines that the restriction mode flag is ON (YES in step S901), the processing proceeds to step S904.

In step S904, the control unit 5 determines whether the clipping mode is executed by the general user. More specifically, the control unit 5 determines whether the image of the partial region set by the management user is acquired (received) by the general user. For example, the control unit 5 periodically acquires information indicating whether the partial region is acquired by the general user, from the display control apparatus 200 of the general user.

In this case, the control unit 5 determines only execution of the clipping mode by the general user. When the control unit 5 determines that the clipping mode is executed by the general user (YES in step S904), then in step S905, the control unit 5 determines whether the execution of the clipping mode by the general user is ended.

When the control unit 5 determines that the execution of the clipping mode by the general user is ended (YES in step S905), then in step S906, the control unit 5 sets the restriction mode flag to OFF. Then, the processing returns to step S901. More specifically, when the image of the partial region is no longer acquired by the display control apparatus 200 of the general user or when the image of the partial region is no longer displayed by the display control apparatus 200 of the general user, the control unit 5 determines that the execution of the clipping mode by the general user is ended.

In this case, the management apparatus 100 may possibly enlarge the image of the partial region to view the partial region in detail. In such a case, for example, the display control apparatus 200 of the general user may perform the following processing when it does not perform monitoring. More specifically, the control unit 5 may set the restriction mode flag to OFF when the image of the partial region is no longer acquired by the management apparatus 100. Alternatively, the control unit 5 may set the restriction mode flag to OFF after the management apparatus 100 completes the processing for displaying the image of the partial region. The display processing refers to, for example, display control processing for displaying the image of the partial region on the display unit 16.

As described above, when the restriction unit 13 instructs to execute the restriction mode, the control unit 5 executes the restriction mode. Then, the control unit 5 continues the execution of the restriction mode until the clipping mode by the general user ends. In other words, the control unit 5 ends the restriction mode upon completion of the clipping mode by the general user. As a result of the above-described processing, the restriction mode flag is set to ON when the restriction mode is notified, the general user first clips an image, and the restriction mode flag is kept ON until the acquisition of the clipped image is completed. It is possible to acquire the image of the partial region in a restricted situation until the user first clips the image together with the processing in FIG. 10.

Although, in the present exemplary embodiment, the control unit 5 ends the restriction mode upon completion of the clipping mode by the general user, the timing of ending the restriction mode is not limited thereto. Depending on the purpose of executing the clipping mode, the restriction mode may be ended when a predetermined time period has elapsed. Ending the restriction mode upon completion of the clipping mode by the general user enables executing the restriction mode for a required time period, and also enables preventing a failure to turn the restriction mode OFF.

Figure 10:
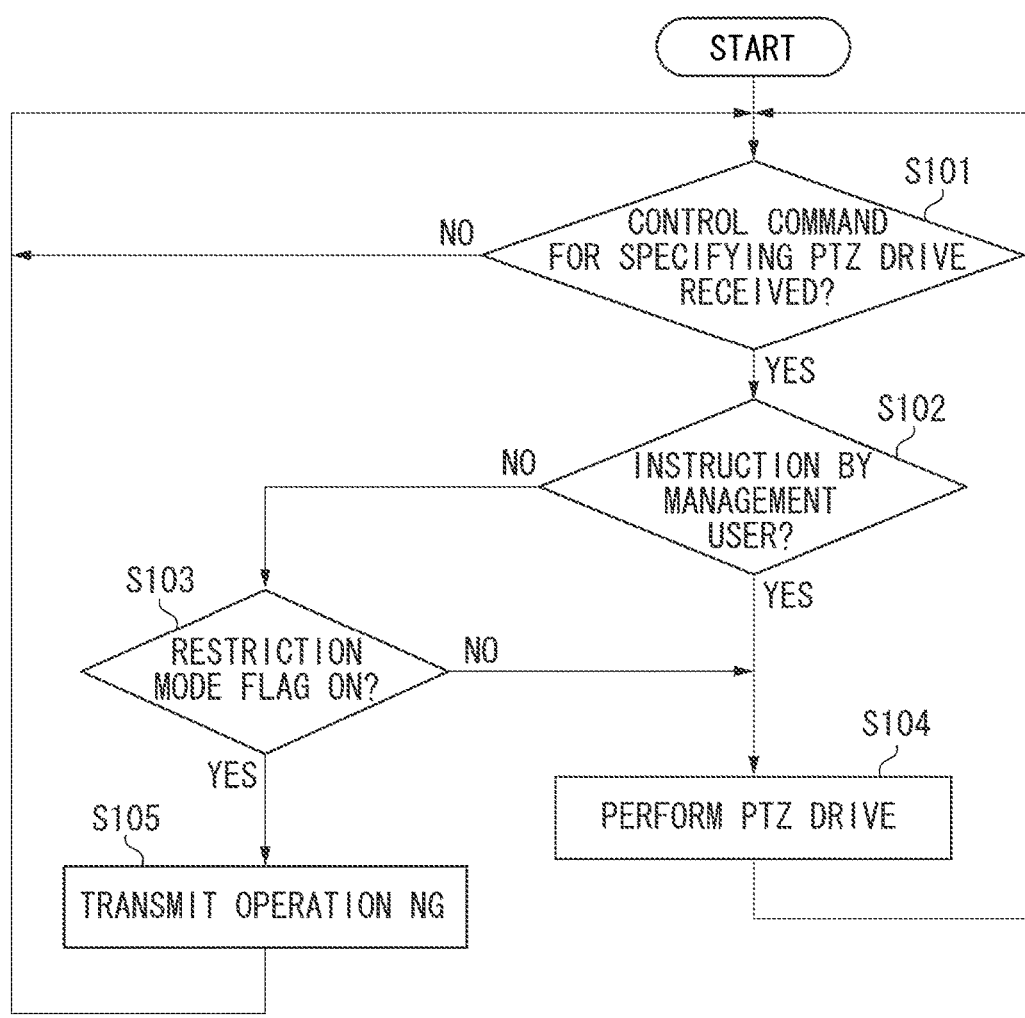
FIG. 10 is a flowchart illustrating an operation in the restriction mode according to the first exemplary embodiment.

Operations of the control unit 5 in the restriction mode will be described below with reference to the flowchart illustrated in FIG. 10. As an example, a method for restricting PTZ drive in the imaging apparatus 10 will be described below.

In step S101, the control unit 5 determines whether a control command for instructing to perform PTZ drive is received. When a control command for instructing to perform PTZ drive is not received (NO in step S101), the processing repeats step S101. On the other hand, when the control unit 5 determines that a control command for instructing to perform PTZ drive is received (YES in step S101), the processing proceeds to step S102.

In step S102, the control unit 5 determines whether the control command for instructing to perform PTZ drive has been transmitted by the management user.

When the control unit 5 determines that the control command for instructing to perform PTZ drive has been transmitted by the management user (YES in step S102), then in step S104, the control unit 5 performs PTZ drive according to the control command. Then, the processing returns to step S101.

On the other hand, when the control unit 5 determines that the control command for instructing to perform PTZ drive has not been transmitted by the management user (NO in step S102), then in step S103, the control unit 5 determines whether the restriction mode flag is ON.

When the restriction mode flag is not ON (NO in step S103), then in step S104, the control unit 5 performs PTZ drive according to the received control command. Then, the processing returns to step S101.

On the other hand, when the control unit 5 determines that the restriction mode flag is ON (YES in step S103), then in step S105, the control unit 5 transmits the information (operation NG) indicating that PTZ drive cannot be performed to the apparatus which has sent the control command. Then, the processing returns to step S101.

For this reason, even if the general user performs an operation input intending to perform PTZ drive, for example, the imaging apparatus 10 does not operate.

As described above, the present exemplary embodiment enables preventing a situation where, when the management user performs clipping on a partial region, the image of the partial region cannot be clipped because of PTZ drive performed by other general user.

A second exemplary embodiment will be described below. For elements similar to those according to the first exemplary embodiment, redundant descriptions thereof will be omitted. In the second exemplary embodiment, PTZ drive is partially permitted in the restriction mode.

Figure 11A:
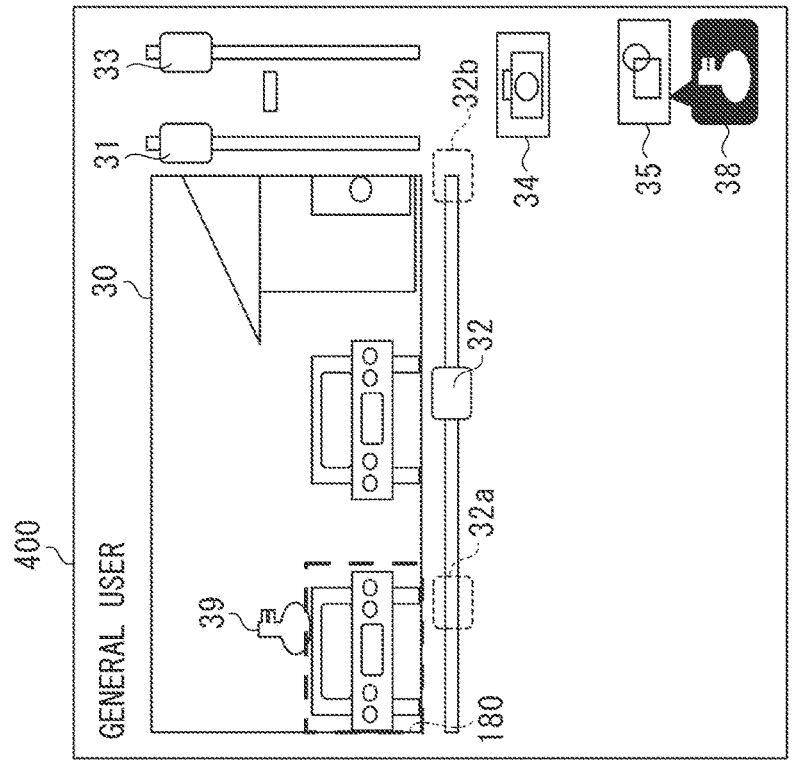
FIGS. 11A and 11B illustrate examples of a display screen of a display control apparatus according to a second exemplary embodiment.
Figure 11B:
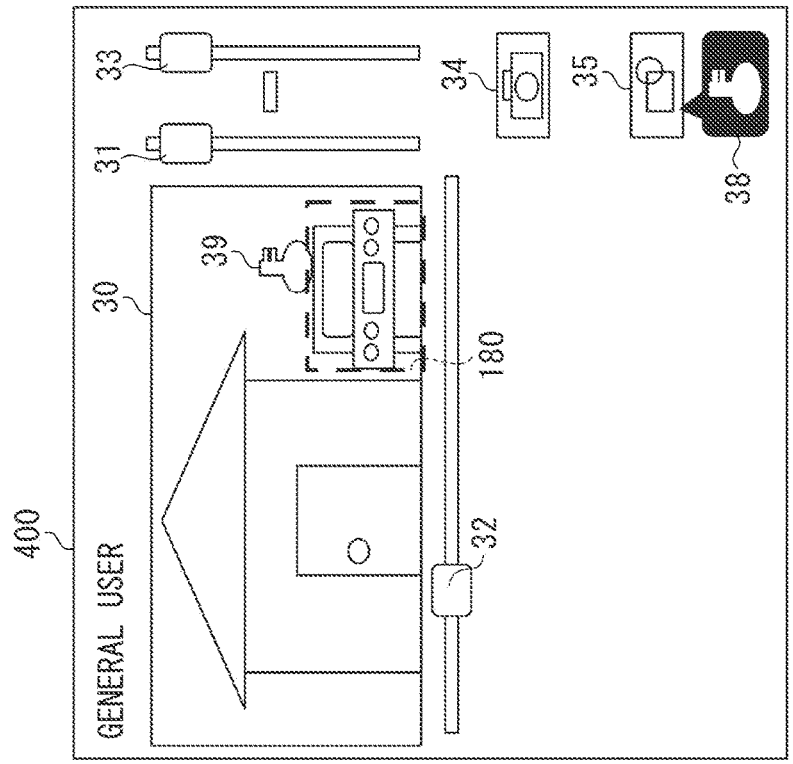

FIGS. 11A and 11B illustrate the display screen 400 of the display control apparatus 200 of the general user in the restriction mode according to the second exemplary embodiment.

As illustrated in FIG. 11A, a frame 180 indicating the partial region currently being clipped is displayed under control of the control unit 22. An icon 39 indicating that the restriction mode is currently selected is displayed under control of the control unit 22.

In the present exemplary embodiment, the restriction unit 14 of the management apparatus 100 transmits position information (for example, coordinate information) indicating the position of the partial region currently being clipped, to the display control apparatus 200 of the general user. Together with the position information, the restriction unit 14 transmits to the display control apparatus 200 a control command for instructing to restrict PTZ drive so that the partial region currently being clipped does not deviate from the imaging range. By transmitting such information to the display control apparatus 200, the restriction unit 14 performs control to restrict PTZ drive.

Upon reception of the position information and the control command transmitted by the restriction unit 14, the control unit 22 of the display control apparatus 200 restricts PTZ drive according to the received position information and control command. Specifically, in response to the position information and the control command, the control unit 22 restricts PTZ drive so that the set partial region does not deviate from the imaging range of the imaging apparatus 10. In other words, the control unit 22 permits PTZ drive in a case where the partial region is within the imaging range of the imaging apparatus 10 even if PTZ drive is performed.

For example, assume a case where the general user performs an operation for moving the pan slider 32 from a position 32a to a position 32b in the state illustrated in FIG. 11A. FIG. 11B illustrates an example of such an operation. Referring to FIGS. 11A and 11B, the range of the captured image 30 assumed to approximately match the imaging range of the imaging apparatus 10.

In the non-restriction mode, since the position 32b is positioned at the rightmost, the control unit 22 generates a control command for instructing to perform pan drive in the rightmost direction within the range in which pan drive can be performed by the pan drive unit 6 in response to a user operation. Then, the communication unit 21 transmits the control command to the imaging apparatus 10. In response to the received control command, the control unit 5 of the imaging apparatus 10 drives the pan drive unit 6 to move the imaging range to the rightmost side.

On the other hand, in the restriction mode, PTZ drive is permitted within a range where the partial region is included in the imaging range. Therefore, as illustrated in FIG. 11B, pan drive is performed up to a point where the partial region (corresponding to the frame 180) is positioned on the leftmost side of the imaging range (corresponding to the captured image 30). The control unit 22 determines whether the partial region deviates from the imaging range. When the control unit 5 determines that the partial region deviates from the imaging range, it restricts the amount of pan drive and generates a control command for instructing to perform pan drive up to a point where the partial region is positioned on the leftmost side of the imaging range. Then, the communication unit 21 transmits the control command to the imaging apparatus 10. In response to the received control command, the control unit 5 of the imaging apparatus 10 drives the pan drive unit 6 to move the imaging range to the rightmost side. As a result, a captured image as illustrated in FIG. 11B will be captured by the imaging apparatus 10. The image of the partial region can be clipped when the partial region is within the imaging range illustrated in FIG. 11B. This processing also applies to tilt drive and zoom drive.

Even when the user performs an operation for moving the pan slider 32 from the position 32a to the position 32b, the control unit 22 forcibly displays the pan slider 32 at the position illustrated in FIG. 11B. The position of the pan slider 32 illustrated in FIG. 11B corresponds to the position of the partial region (corresponding to the frame 180) illustrated in FIG. 11B. Such display enables the general user to recognize that PTZ drive is restricted.

Restriction on PTZ drive may be performed by the imaging apparatus 10. In this case, the restriction unit of the management apparatus 100 transmits position information (for example, coordinate information) indicating the position of the partial region currently being clipped to the imaging apparatus 10. Together with the position information, the restriction unit 14 transmits to the imaging apparatus 10 a control command for instructing to restrict PTZ drive so that the partial region currently being clipped does not deviate from the imaging range. By transmitting such information to the display control apparatus 200, the restriction unit 14 performs control to restrict PTZ drive.

Upon reception of the position information and the control command transmitted by the restriction unit 14, the control unit 5 of the imaging apparatus 10 restricts PTZ drive according to the received position information and control command. Specifically, in response to the position information and the control command, the control unit 5 restricts PTZ drive so that the partial region does not deviate from the imaging range of the imaging apparatus 10. In other words, the control unit 5 performs PTZ drive in a case where the partial region is within the imaging range of the imaging apparatus 10.

For example, assume a case where the general user performs an operation for moving the pan slider 32 from the position 32a to the position 32b in the state illustrated in FIG. 11A.

In the non-restriction mode, the control unit 22 generates a control command for instructing to perform pan drive in the rightmost direction within the range in which pan drive can be performed by the pan drive unit 6 in response to a user operation. Then, the communication unit 21 transmits the control command to the imaging apparatus 10.

Based on the position information received from the restriction unit 14, the control unit 5 of the imaging apparatus 10 determines whether the partial region deviates from the imaging range when the control command is executed. When the control unit 5 determines that the partial region deviates from the imaging range, the control unit 5 restricts pan drive. More specifically, the control unit 5 performs pan drive up to a position where the partial region does not deviate from the imaging range of the imaging apparatus 10. This processing also applied to tilt drive and zoom drive.

Figure 12A:
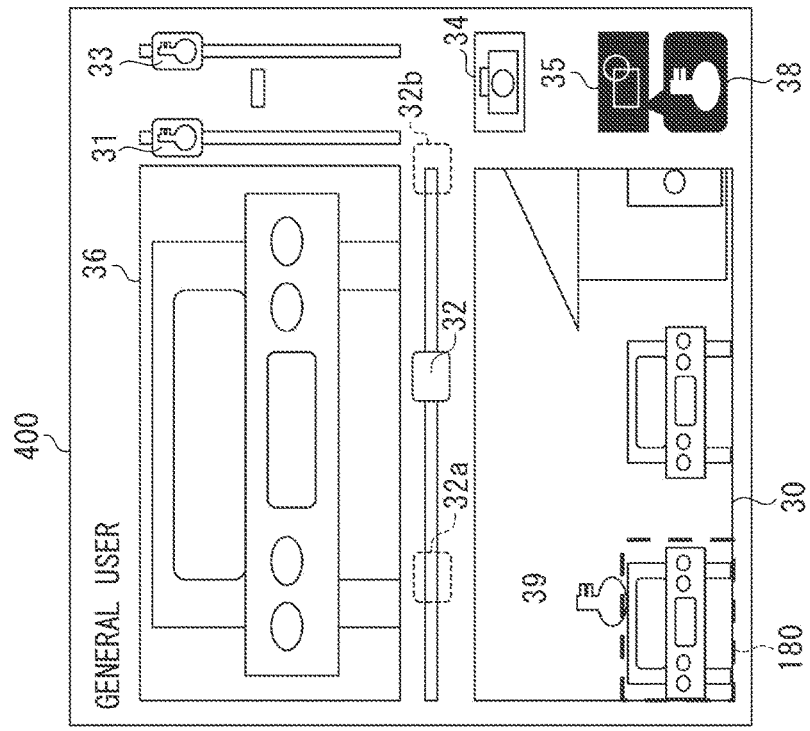
FIGS. 12A and 12B illustrate examples of a display screen of the display control apparatus displayed when image clipping is performed according to the second exemplary embodiment.
Figure 12B:
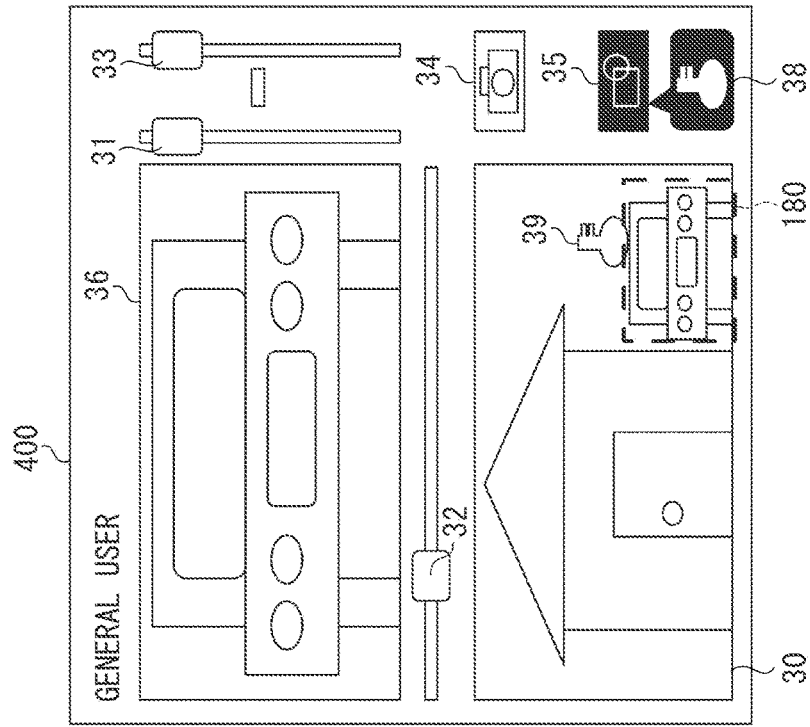

FIGS. 12A and 12B illustrate the display screen 400 of the display apparatus 200 of the general user when the general user executes the clipping mode. Similar to FIGS. 11A and 11B, assume a case where the general user performs an operation for moving the pan slider 32 from the position 32a to the position 32b in the state illustrated in FIG. 12A. FIG. 12B illustrates an example of display when such an operation is performed. Although the operation is similar to that illustrated in FIGS. 11A and 11B, the image 36 of the partial region remains unchanged between FIGS. 12A and 12B.

Figure 13:
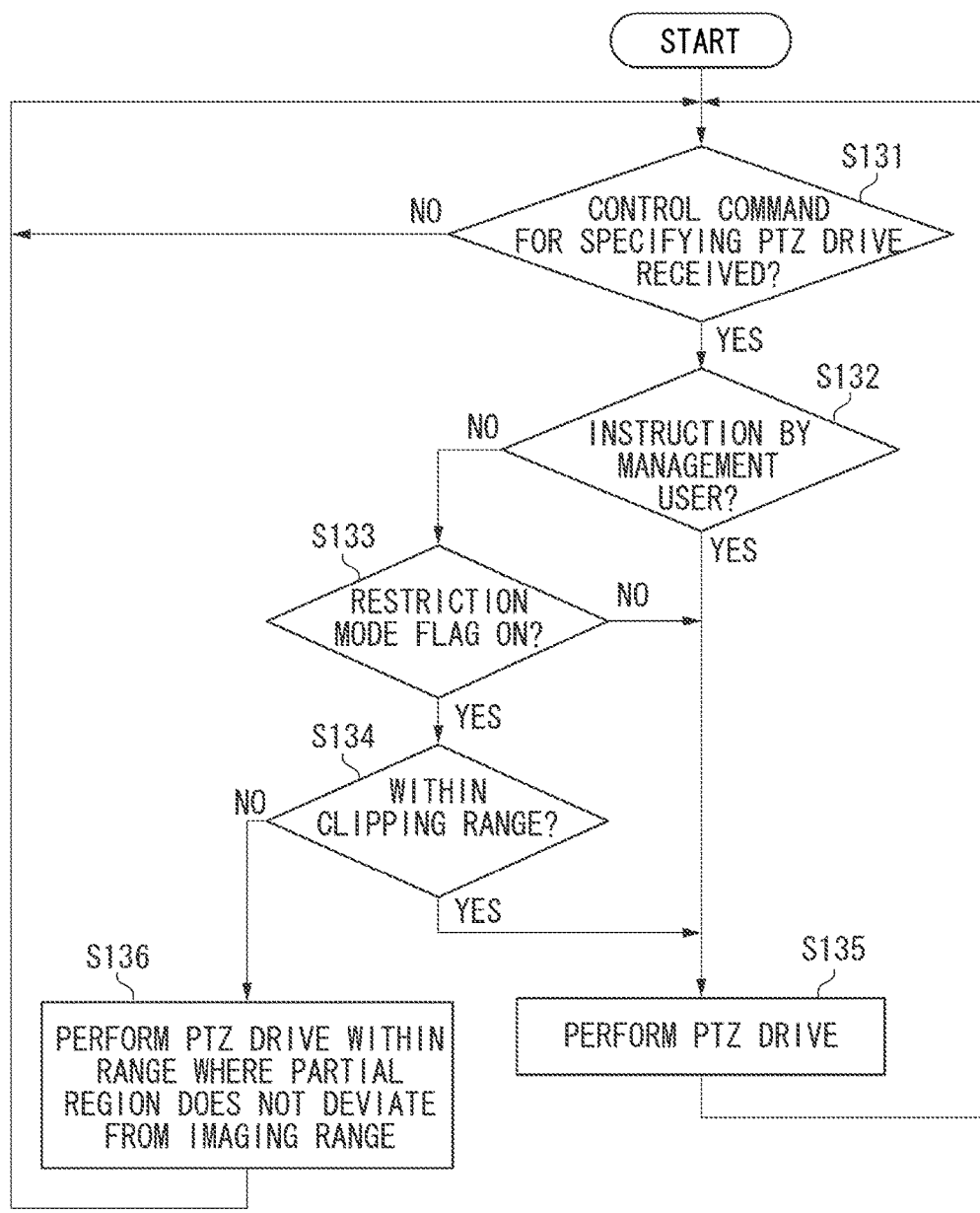
FIG. 13 is a flowchart illustrating an operation in the restriction mode according to the second exemplary embodiment.

Operations of the control unit 5 in the restriction mode according to the second exemplary embodiment will be described in detail below with reference to the flowchart illustrated in FIG. 13. As an example, a method for restricting PTZ drive in the imaging apparatus 10 will be described below.

In step S131, the control unit 5 determines whether a control command for instructing to perform PTZ drive is received. When a control command for instructing to perform PTZ drive in step S131 is not received (NO in step S131), the processing repeats step S131. On the other hand, when the control unit 5 determines that a control command for instructing to perform PTZ drive is received (YES in step S131), the processing proceeds to step S132.

In step S132, the control unit 5 determines whether the control command for instructing to perform PTZ drive has been transmitted by the management user.

When the control unit 5 determines that the control command has been transmitted by the management user (YES in step S132), then in step S135, the control unit 5 performs PTZ drive according to the control command. Then, the processing returns to step S131.

On the other hand, when the control unit 5 determines that the control command has not been transmitted by the management user (NO in step S132), then in step S133, the control unit 5 determines whether the restriction mode flag is ON.

When the control unit 5 determines that the restriction mode flag is not ON (NO in step S133), then in step S135, the control unit 5 performs PTZ drive according to the received control command. Then, the processing returns to step S131.

On the other hand, when the control unit 5 determines that the restriction mode flag is ON (YES in step S133), the processing proceeds to step S134.

In step S134, the control unit 5 determines whether the received control command is executable. Specifically, based on the position information indicating the position of the partial region received from the restriction unit 14, the control unit 5 determines whether the partial region deviates from the imaging range (whether the partial region is within a range in which clipping is possible) when the received control command is executed.

When the control unit 5 determines that the partial region does not deviate from the imaging range (the partial region is within a range in which clipping is possible) (YES in step S134), then in step S135, the control unit 5 performs PTZ drive according to the received control command. Then, the processing returns to step S131.

On the other hand, when the control unit 5 determines that the partial region deviates from the imaging range (the partial region is not within a range in which clipping is possible) (NO in step S134), the processing proceeds to step S136.

In step S136, the control unit 5 calculates a range in which the partial region does not deviate from the imaging range when a drive unit is driven in the drive direction indicated by the control command, and performs PTZ drive within the range. Then, the processing returns to step S131.

As described above, the present exemplary embodiment enables preventing a situation where, when the management user sets a partial region, the set partial region cannot be clipped because of PTZ drive performed by the general user.

Other Exemplary Embodiments

Figure 14:
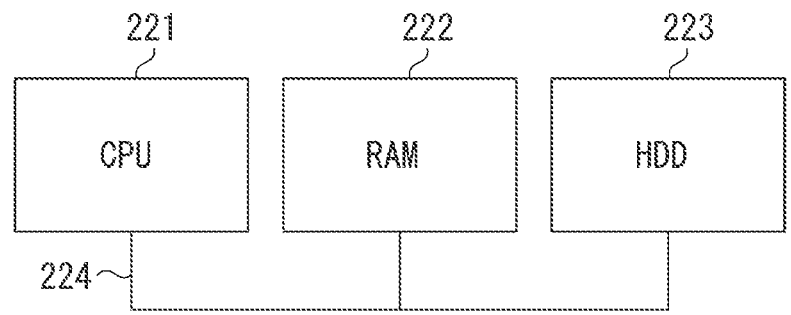
FIG. 14 is a block diagram illustrating a hardware configuration of a control apparatus according to each embodiment.

Hardware configurations of the control unit 5 and the signal processing unit 4 of the imaging apparatus 10, the control unit 12 of the management apparatus 100, and the control unit 22 of the display control apparatus 200 in each exemplary embodiment will be described below with reference to FIG. 14. Each of these configurations can be implemented by the hardware configuration illustrated in FIG. 14.

A random access memory (RAM) 222 temporarily stores a computer program to be executed by a central processing unit (CPU) 221. The RAM 222 temporarily stores data acquired from outside via the communication unit 21. The RAM 222 also serves as a work area used by the CPU 221 to execute various types of processing. The RAM 222 functions, for example, as a frame memory and as a buffer memory.

The CPU 221 executes a computer program stored in the RAM 222. In addition to the CPU 221, such a processor as a Digital Signal Processor (DSP) and an Application Specific Integrated Circuit (ASIC) may be used.

A Hard Disk Drive (HDD) 223 stores programs of an operating system and image data. The HDD 223 also stores computer programs.

Under control of the CPU 221, computer programs and data stored in the HDD 223 are suitably loaded into the RAM 222 and executed by the CPU 221. In addition to the HDD 223, other storage media such as a flash memory may be used. A bus 224 connects the above-described hardware components. Each hardware component exchanges data via the bus 224. This completes description of the hardware configuration according to each exemplary embodiment.

The present invention can also be achieved when a program for implementing at least one of the above-described functions is supplied to a system or apparatus via a network or storage medium, and at least one processor in a computer of the system or apparatus reads and executes the program. Further, the present invention can also be achieved by a circuit for implementing at least one function (for example, an ASIC chip).

The above-described flowcharts can be implemented when a CPU executes processing based on a program loaded into memory.

The present invention is not limited to the above-described exemplary embodiments but can be modified in diverse ways without departing from the spirit and scope thereof. For example, combinations of the above-described exemplary embodiment are also intended to be included in the present invention.

According to the above-described exemplary embodiments, it is possible to provide a technique for reducing the possibility that a user who has set an image clipping range unintentionally becomes unable to obtain a desired image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-219914, filed Nov. 9, 2015, which is hereby incorporated by reference herein in its entirety.

What is claimed is:

1. A control apparatus comprising:
   circuitry configured to:
   acquire an image of a partial region which is a portion of an image captured by an imaging unit; and
   restrict an operation of a driving unit for changing an imaging range of the imaging unit during a time in which the image of the partial region is acquired,
   wherein, upon completion of acquisition of the image of the partial region, the circuitry ends the restriction of the operation of the driving unit.

2. The control apparatus according to claim 1, wherein the circuitry is configured to set a position and a size of the partial region in the captured image.

3. The control apparatus according to claim 1, wherein the circuitry is configured to set a position of the partial region in response to an operation input by a user.

4. The control apparatus according to claim 1, wherein the circuitry is configured to set a position of the partial region according to a result of detection by an object detection unit for detecting an object from the captured image.

5. The control apparatus according to claim 1, wherein the circuitry is configured to restrict the operations of the driving unit according to the position of the partial region.

6. The control apparatus according to claim 1, wherein the circuitry is configured to move the position of the partial region with respect to the captured image according to changing of the imaging range of the imaging unit by the driving unit.

7. The control apparatus according to claim 6, wherein, in a case where an area corresponding to a predetermined subject included in the captured image is set as the partial region, upon a change of the imaging range of the imaging unit by the driving unit, the circuitry is configured to move the position of the partial region in the captured image to an area corresponding to the predetermined subject in the captured image after the imaging range of the imaging unit is changed by the driving unit.

8. The control apparatus according to claim 1, wherein, in a predetermined time after the position of the partial region is set, the circuitry is configured to restrict the operations of the driving unit.

9. The control apparatus according to claim 1, wherein the circuitry is configured to:
   restrict the operation of the driving unit so that the partial region does not deviate from the imaging range of the imaging unit during a time in which the partial region is set.

10. The control apparatus according to claim 1, wherein the driving unit is configured to physically move the imaging unit.

11. The control apparatus according to claim 1, wherein the driving unit includes at least either one of a pan unit for rotating the imaging unit in a pan direction or a tilt unit for rotating the imaging unit in a tilt direction.

12. The control apparatus according to claim 1, wherein the driving unit is configured to optically change the imaging range of the imaging unit.

13. The control apparatus according to claim 1, wherein the circuitry is unit configured to transmit the image of the partial to another apparatus.

14. The control apparatus according to claim 1, wherein an image of the partial region is an image clipped from the captured image.

15. A control method comprising:
   acquiring an image of a partial region which is a portion of an image captured by an imaging unit; and
   restricting an operation of a driving unit for changing an imaging range of the imaging unit during a time in which the image of the partial region is acquired,
   wherein, upon completion of acquisition of the image of the partial region, the restriction of the operation of the driving unit is ended.

16. A non-transitory computer readable recording medium storing a program for causing a computer to perform a controlling method, the controlling method comprising:
   acquiring an image of a partial region which is a portion of an image captured by an imaging unit; and
   restricting an operation of a driving unit for changing an imaging range of the imaging unit during a time in which the image of the partial region is acquired,
   wherein, upon completion of acquisition of the image of the partial region, the restriction of the operation of the driving unit is ended.

* * * * *